US012656109B2

(12) United States Patent
Tokuda et al.

(10) Patent No.: US 12,656,109 B2
(45) Date of Patent: Jun. 16, 2026

(54) ESTIMATION APPARATUS FOR WATER FILM THICKNESS ON ROAD SURFACE

(71) Applicant: Sumitomo Rubber Industries, Ltd., Kobe (JP)

(72) Inventors: Kazuma Tokuda, Kobe (JP); Naoki Morita, Kobe (JP); Yusuke Maeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 437 days.

(21) Appl. No.: 18/389,014

(22) Filed: Nov. 13, 2023

(65) Prior Publication Data

US 2024/0175679 A1 May 30, 2024

(30) Foreign Application Priority Data

Nov. 29, 2022 (JP) ................................. 2022-190021

(51) Int. Cl.
*G01B 21/08* (2006.01)
(52) U.S. Cl.
CPC .................................... *G01B 21/08* (2013.01)
(58) Field of Classification Search
None
See application file for complete search history.

(56) References Cited

U.S. PATENT DOCUMENTS 5,705,746 A 1/1998 Trost et al.
10,082,795 B2 * 9/2018 Zhao .................... G05D 1/0246

12,240,433 B2 * 3/2025 Cote ...................... G01B 17/02
2003/0101805 A1 6/2003 Raab
2009/0105921 A1 4/2009 Hanatsuka et al.

FOREIGN PATENT DOCUMENTS

CN 111563478 A 8/2020
CN 112146584 B * 7/2022 ............. G01B 11/06
FR 3014064 A1 * 6/2015 ............ B60W 50/14
JP 2001-99779 A 4/2001

OTHER PUBLICATIONS

Extended European Search Report for European Application No. 23207890.7, dated Apr. 17, 2024.

* cited by examiner

*Primary Examiner* — Peter J Macchiarolo
*Assistant Examiner* — Jermaine L Jenkins
(74) *Attorney, Agent, or Firm* — Birch, Stewart, Kolasch & Birch, LLP

(57) ABSTRACT

An estimation apparatus for a water film thickness on a road surface includes a data acquisition unit and an estimation unit. The data acquisition unit sequentially acquires a data set including driving force data representing a driving force output from a driving source of a vehicle and acceleration data representing a longitudinal acceleration of the vehicle, while the vehicle is traveling. The estimation unit estimates a thickness of a water film on a road surface on which the vehicle travels, based on a relationship between a speed of the vehicle and a fluid resistance that the vehicle receives from the water film, the flow resistance being calculated based on the data set.

15 Claims, 8 Drawing Sheets

ESTIMATION APPARATUS FOR WATER FILM THICKNESS ON ROAD SURFACE

CROSS REFERENCE TO RELATED APPLICATIONS

This application claims priority to Japanese Patent Application No. 2022-190021 filed on Nov. 29, 2022, the entire contents of which are incorporated herein by reference.

FIELD OF INVENTION

The present invention relates to an estimation apparatus, an estimation method, and an estimation program for estimating a water film thickness on a road surface on which a vehicle travels.

BACKGROUND

JP 2001-099779A discloses an apparatus that detects the presence and an amount of a water film between a tire of a traveling vehicle and a road surface. According to JP 2001-099779A, the presence of a water film can be detected by embedding a water film sensor (electrode pair) in a tire, or the amount of a water film can be detected by embedding a plurality of pressure sensors in a tire.

SUMMARY of INVENTION

In the apparatus disclosed in JP 2001-099779A, it is necessary to use a tire in which electrode pairs and pressure sensors are embedded in such a manner that the electrode pairs and the sensors are at least partially exposed to the tire surface. Not only tires that can be mounted on a vehicle are limited, but also procurements of such tires require additional costs. Therefore, there has been a demand for a technique capable of estimating the amount of water film on the road surface where the vehicle travels, without requiring a new sensor or special equipment.

An object of the present invention is to provide an estimation apparatus, an estimation method, and an estimation program capable of estimating the thickness of a water film on a road surface on which a vehicle travels, with a simple configuration.

An estimation apparatus for a water film thickness on a road surface according to a first aspect of the present invention includes a data acquisition unit and an estimation unit.

The data acquisition unit sequentially acquires a data set including driving force data representing a driving force output from a driving source of a vehicle and acceleration data representing a longitudinal acceleration of the vehicle, while the vehicle is traveling.

The estimation unit estimates a thickness of a water film on a road surface on which the vehicle travels, based on the data set.

The estimation unit estimates the thickness of the water film based on a relationship between a speed of the vehicle and a fluid resistance that the vehicle receives from the water film, the flow resistance being calculated based on the data set.

An estimation apparatus according to a second aspect is the estimation apparatus according to the first aspect, in which the estimation unit estimates the thickness of the water film based on a gradient of a regression line between a square of the speed of the vehicle and the fluid resistance.

An estimation apparatus according to a third aspect is the estimation apparatus according to the first aspect or the second aspect, in which the estimation unit estimates the thickness of the water film based on the data set during a time period in which the speed of the vehicle is equal to or higher than a predetermined speed or the speed of the vehicle is higher than a predetermined speed.

An estimation apparatus according to a fourth aspect is the estimation apparatus according to any one of the first to third aspects, in which the data acquisition unit acquires wheel speed data representing a wheel speed of a wheel of the vehicle.

A method for estimating a water film thickness on a road surface according to a fifth aspect is a water film thickness estimation method executed by one or a plurality of computers, and includes:

sequentially acquiring a data set including driving force data representing a driving force output from a driving source of a vehicle and acceleration data representing a longitudinal acceleration of the vehicle, while the vehicle is traveling: and estimating a thickness of a water film on a road surface on which the vehicle travels, based on the data set, and the estimating includes calculating a fluid resistance that the vehicle receives from the water film based on the data set, and estimating the thickness of the water film based on a relationship between the calculated fluid resistance and a speed of the vehicle.

A program for estimating a water film thickness on a road surface according to a sixth aspect, the program causes one or a plurality of computers to execute the following:

sequentially acquiring a data set including driving force data representing a driving force output from a driving source of a vehicle and acceleration data representing a longitudinal acceleration of the vehicle, while the vehicle is traveling: and estimating a thickness of a water film on a road surface on which the vehicle travels, based on the data set, and the estimating includes calculating a fluid resistance that the vehicle receives from the water film based on the data set, and estimating the thickness of the water film based on a relationship between the calculated fluid resistance and a speed of the vehicle.

According to the above aspects, it is possible to estimate the thickness of the water film on the road surface on which the vehicle travels based on the data that can be acquired from equipment that is usually provided to the vehicle, without requiring an additional sensor or special equipment.

DETAILED DESCRIPTION OF THE PREFERRED EMBODIMENTS

An estimation apparatus, method, and program according to one embodiment of the present invention will now be explained with reference to some drawings.

1. Configuration of Estimation Apparatus

Figure 1:
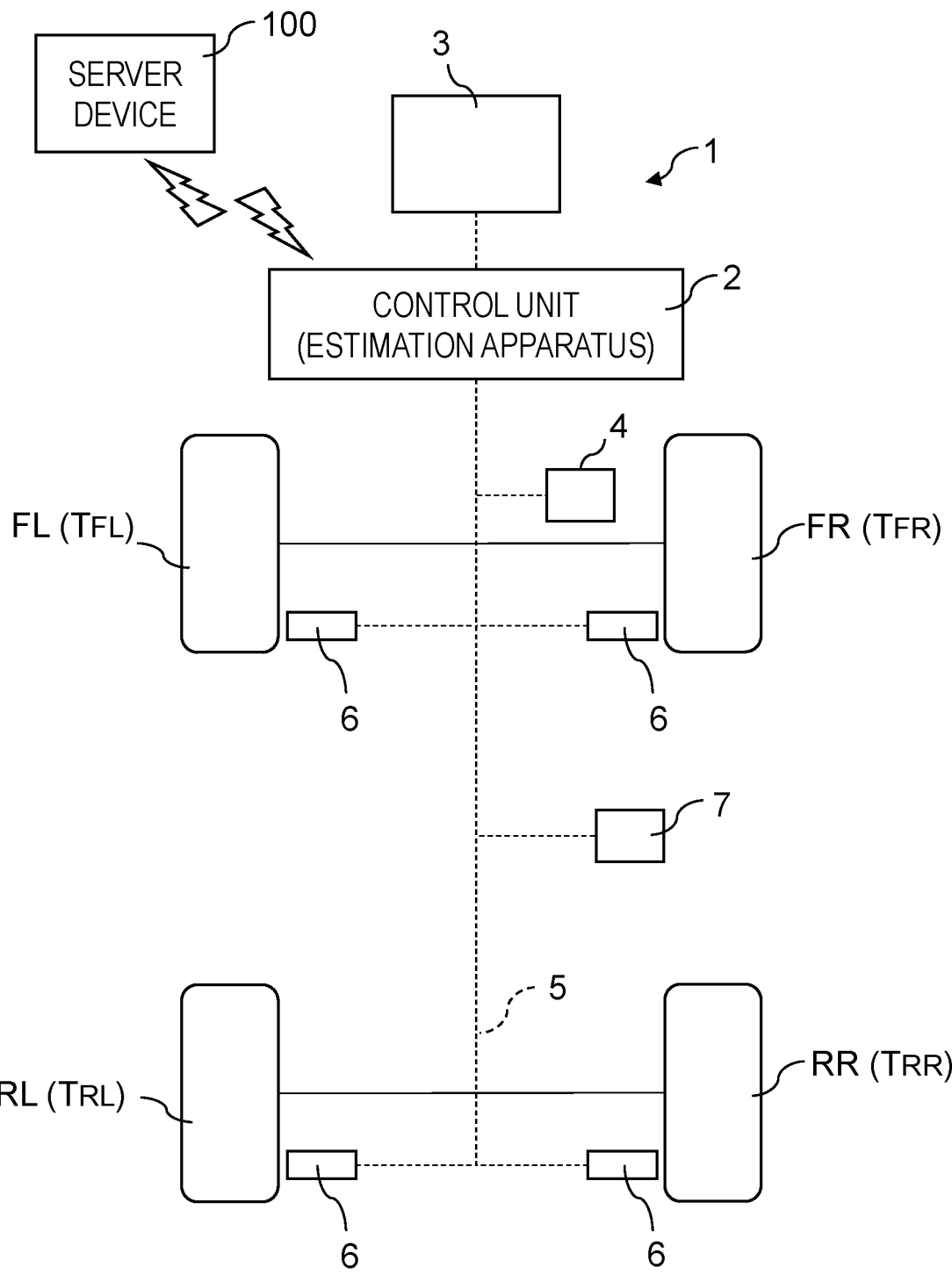
FIG. 1 is a schematic diagram showing a state in which a control unit as an estimation apparatus according to one embodiment is mounted on a vehicle.

FIG. 1 is a schematic diagram showing a state in which a control unit 2 as an estimation apparatus according to the present embodiment is mounted on a vehicle 1. The vehicle 1 is a four-wheeled vehicle, and includes a front left wheel FL, a front right wheel FR, a rear left wheel RL, and a rear right wheel RR. The wheels FL, FR, RL, and RR have tires TFL, TFR, TRL, and TRR mounted thereon, respectively. The vehicle 1 according to the present embodiment is a front-wheel drive vehicle that includes an engine as a driving source, in which the wheels FL and FR are driving wheels, and the wheels RL and RR are driven wheels. The vehicle 1 is not limited thereto, and may be a rear-wheel drive vehicle or a 4WD vehicle in which all of the four wheels are driving wheels. The vehicle 1 may include an electric motor as a driving source, in addition to or instead of the engine.

The control unit 2 estimates the thickness d of a water film (including d=0 that is a case in which there is no water film on the road surface) on the road surface on which the vehicle 1 travels, based on data output from sensors and equipment that are usually included in the vehicle 1 to control traveling. The information on the thickness d of the water film can be used, for example, for various types of control for controlling the traveling of the vehicle, or creating a road map related to the condition of the road surface, for example. The various types of control for controlling the traveling of the vehicle include, for example, issuing warnings such as that for hydroplaning to the driver, controlling a brake system, and controlling the distance to the preceding vehicle, for example. In the present embodiment, to issue a warning to the driver, an index, to be described later, is used, in addition to the estimated thickness d of the water film.

A wheel speed sensor 6 is attached to each of the tires $T_{FL}$, $T_{FR}$, $T_{RL}$, and $T_{RR}$ (more precisely, the wheels FL, FR, RL, RR) of the vehicle 1, and detects wheel speed data indicating the wheel speed of the tire to which the wheel speed sensor 6 is attached. As the wheel speed sensor 6, any sensor may be used, as long as the sensor is capable of detecting the wheel speed of the corresponding traveling wheel FL, FR, RL, and RR. Examples of types of sensors that may be used include a sensor that measures the wheel speed from an output signal from an electromagnetic pickup, and a sensor that generates power using the rotation, as a dynamo does, and measures the wheel speed from the resultant voltage. The position where the wheel speed sensor 6 is attached is also not limited to a particular position, as long as the wheel speed can be detected, and may be selected as appropriate, in the manner suitable for the type of sensor. The wheel speed sensor 6 is connected to the control unit 2 via a communication line 5. Information on the rotation speeds V1 to V4 detected by the respective wheel speed sensors 6 is transmitted to the control unit 2 in real time.

Also attached to the vehicle 1 is a wheel torque sensor 4 (hereinafter, simply referred to as a torque sensor 4) that detects the wheel torque WT of the vehicle 1. The structure and the attached position of the torque sensor 4 are not limited to a particular structure and position as long as the torque sensor 4 can detect the wheel torque WT of the vehicle 1. The torque sensor 4 is connected to the control unit 2 via a communication line 5. Information of the wheel torque WT detected by the torque sensor 4 is transmitted to the control unit 2 in real time, similarly to the information of the rotational speeds V1 to V4. Information of the wheel torque WT detected by the torque sensor 4 is an example of "driving force data representing a driving force" according to the present invention.

Also attached on the vehicle 1 is an acceleration sensor 7 that detects the longitudinal acceleration a of the vehicle 1. The structure and the attaching position of the acceleration sensor 7 are not limited to a particular structure and position as long as the acceleration sensor 7 can detect the longitudinal acceleration a of the vehicle 1. The acceleration sensor 7 is connected to the control unit 2 via a communication line 5. The information of the longitudinal acceleration a detected by the acceleration sensor 7 is transmitted to the control unit 2 in real time, similarly to the information of the rotational speeds V1 to V4. The information of the longitudinal acceleration a detected by the acceleration sensor 7 is an example of "acceleration data representing a longitudinal acceleration" according to the present invention.

Figure 2:
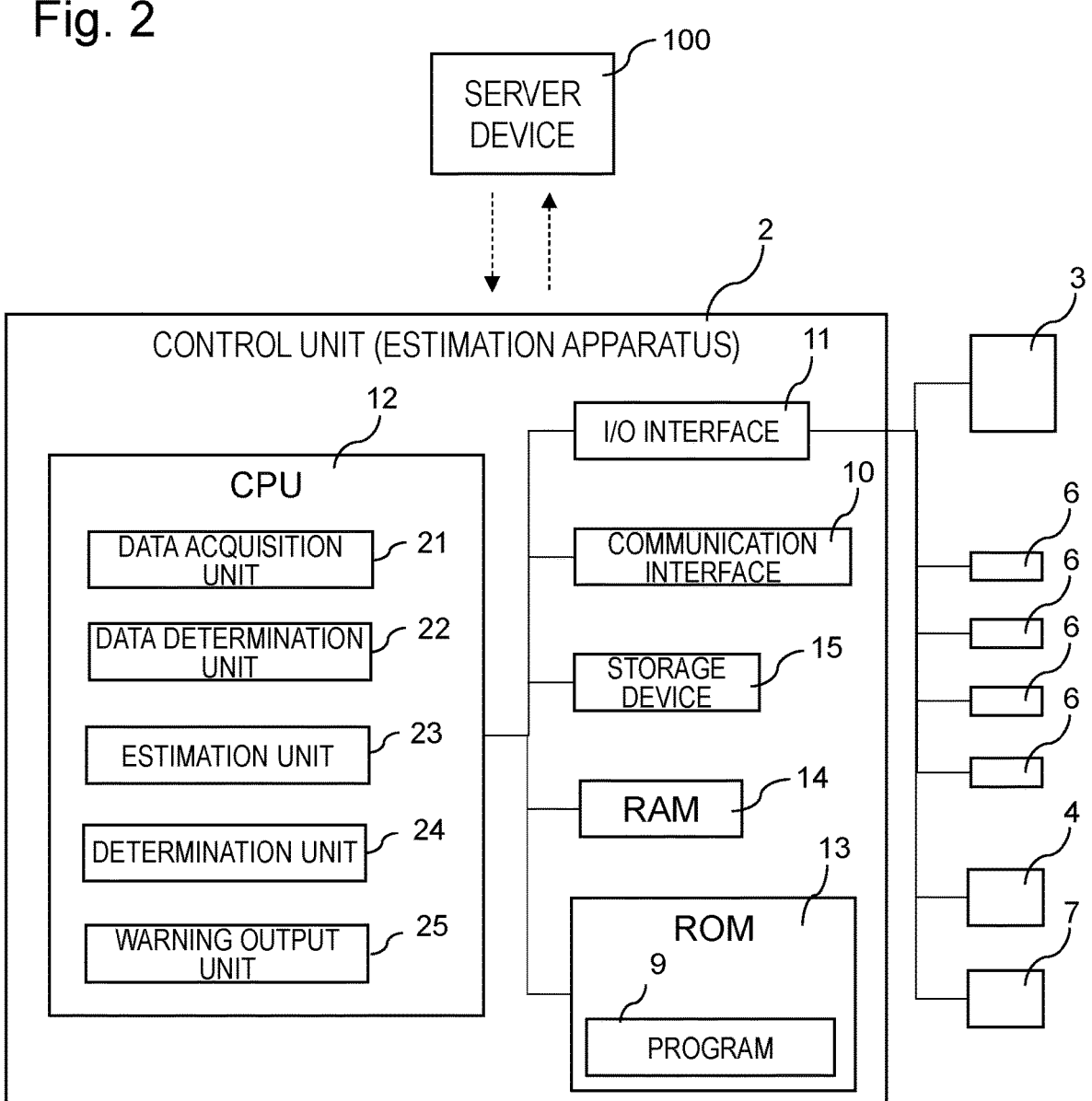
FIG. 2 is a block diagram showing an electrical configuration of the control unit according to the one embodiment.

FIG. 2 is a block diagram showing an electrical configuration of the control unit 2. The control unit 2 is mounted on the vehicle 1, and includes a communication interface 10, an I/O interface 11, a CPU 12, a ROM 13, a RAM 14, and a nonvolatile rewritable storage device 15, as illustrated in FIG. 2. The communication interface 10 is a communication module for enabling connection to be established to a network outside the vehicle 1 such as the Internet. The I/O interface 11 is an apparatus for inputting and outputting data to and from various onboard sensors, driving sources such as a motor and an engine, and onboard devices such as an indicator 3, which will be described later. The ROM 13 stores therein a program 9 for controlling the operation of the parts of the vehicle 1. The CPU 12 reads and executes the program 9 from the ROM 13 to virtually operate as a data acquisition unit 21, a data determination unit 22, an estimation unit 23, a determination unit 24, and a warning output unit 25. Operations of these units 21 to 25 will be described later in detail. The storage device 15 is implemented as a hard disk or a flash memory, for example. The location in which the program 9 is stored may also be the storage device 15, instead of the ROM 13. The RAM 14 and the storage device 15 are used in operations of the CPU 12, as appropriate.

The indicator 3 can output various types of information including a warning to a user (mainly a driver), and may be implemented in any form, such as a liquid crystal display element, a liquid crystal monitor, a plasma display, or an organic EL display. The position the indicator 3 is attached may be selected as appropriate, and preferably, provided at a position easily recognizable by a driver, such as on an instrument panel. When the control unit 2 is connected to a car navigation system, a monitor of the car navigation system may be used as the indicator 3. When a monitor is used as the indicator 3, the warning may also be an icon or character information displayed on the monitor.

2. Principle of Estimation of Thickness of Water Film

Figure 3:
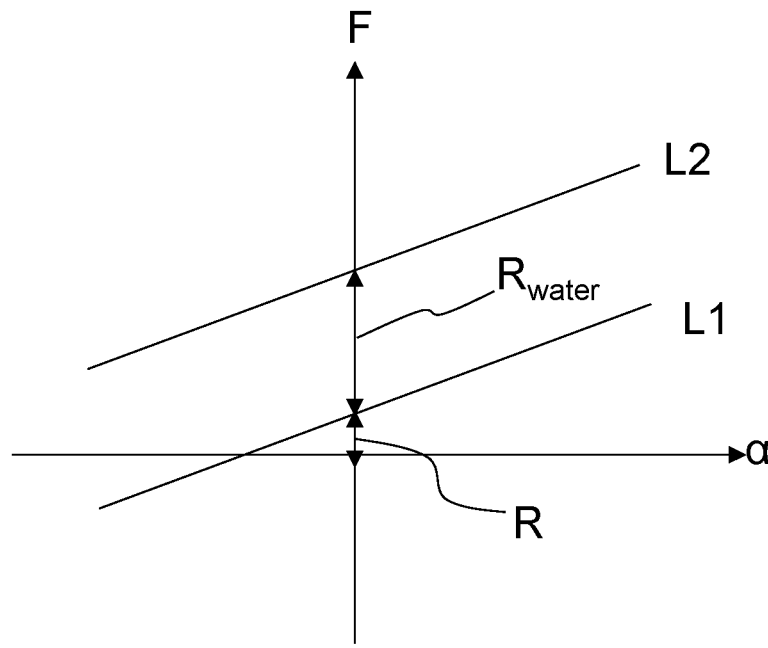
FIG. 3 is a diagram for explaining a relationship between a longitudinal acceleration and a driving force.

Ideally, it can be considered that the traveling of the vehicle 1 on the dry road surface follows the following equation of motion. In this equation, F denotes the driving force output from the driving source of the vehicle 1: M denotes the mass of the vehicle 1: α denotes the longitudinal acceleration of the vehicle 1: and R denotes the traveling resistance received, when the vehicle 1 moves straight at a constant speed on a dry road surface without any grade. The "dry road surface" includes not only a dry road surface but also a road surface without any water film. As illustrated in FIG. 3, this relationship is represented, on a plane in which the horizontal axis represents the longitudinal acceleration α and the vertical axis represents the driving force (braking force) F, as a straight line L1 having a gradient M and an intercept R.

$$F = M\alpha + R$$

When there is a water film on the road surface, the vehicle 1 receives a fluid resistance $R_{water}$, due to the water film, as well as the traveling resistance R. In this condition, the equation of motion can be rewritten as follows, as an equation representing the straight line L2 in FIG. 3. In other words, because the fluid resistance $R_{water}$ is applied to the vehicle 1, a larger driving force F is required to output the longitudinal acceleration α with the same magnitude, as that of the longitudinal acceleration a on the dry road surface.

$$F = M\alpha + R + R_{water}$$

Based on the above, if the mass M of the vehicle 1 and R on the dry road surface can be identified based on a large number of data sets of the data of the longitudinal acceleration a and the data of the driving force F, $R_{water}$ can be estimated from the data sets of α and F.

Figure 4:
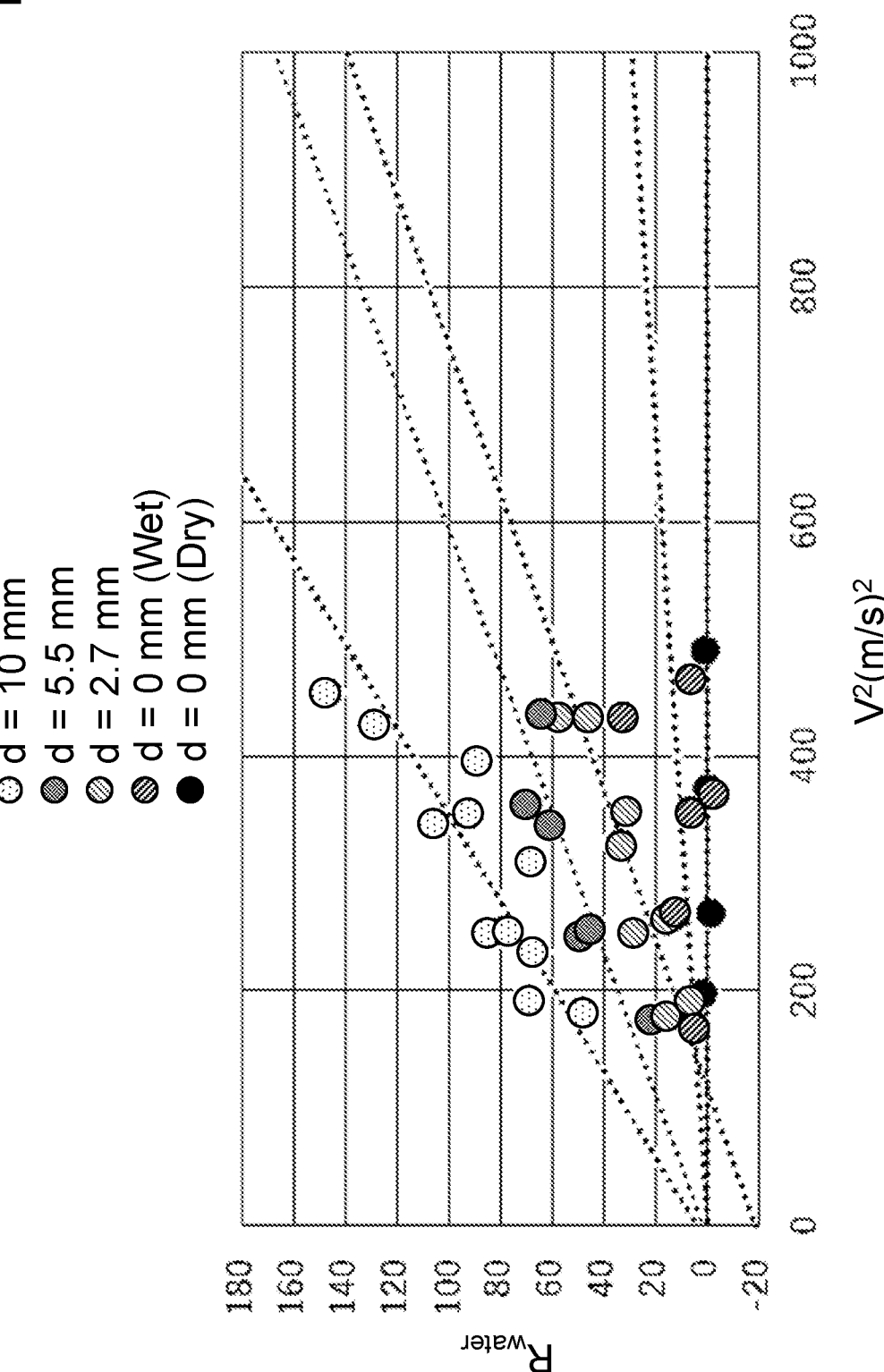
FIG. 4 is a graph plotting the square of a vehicle speed and a fluid resistance.

On the other hand, the fluid resistance $R_{water}$ is proportional to the square $(V^2)$ of the vehicle speed V that is the speed of the vehicle 1. In a plane in which a horizontal axis representing $V^2$ and the vertical axis representing the fluid resistance $R_{water}$, this proportional relationship can be expressed as a straight line, as illustrated in FIG. 4. The inventors of the present invention have collected and studied $V^2$ and the fluid resistance $R_{water}$ data under various conditions of the thicknesses d of the water film, and found out that the gradient C of the regression line of $V^2$-$R_{water}$ increases as the thickness d of the water film increases. In other words, by running a regression analysis on a large number of data sets of $V^2$ and $R_{water}$ with known thicknesses d of water film, and identifying the relationship between the thickness d and the gradient C in advance, it becomes possible to estimate the thickness d of the water film from the gradient C identified from a data set of the vehicle speed V and the fluid resistance $R_{water}$ acquired while the vehicle 1 is traveling. In the present embodiment, assuming that the thickness d and the gradient C are in a proportional relationship expressed as $d=C/C_0$, the coefficient $C_0$ is identified in advance, by performing a regression analysis on a large number of data sets of the thickness d and the gradient C. The method of the regression analysis is not limited to a particular method, but may be a least squares method or a sequential least squares method, for example.

Specifically, (Mα+R) is a traveling resistance obtained by taking the sum of an air resistance $R_1$, an acceleration resistance $R_2$, a rolling resistance $R_3$, and a grade resistance $R_4$. This traveling resistance is denoted as $R_{sum}$. When the vehicle 1 actually travels on the road surface, the traveling resistance $R_{sum}$ changes according to factors such as the vehicle speed V, the longitudinal acceleration α, and the condition of the gradient of the road surface. In other words, to estimate the fluid resistance $R_{water}$ based on the data of the running vehicle 1, it is necessary to cancel the resistance $R_1$ to $R_4$ from the data of the driving force F. Therefore, in the present embodiment, coefficients $C_1$ to $C_3$ for calculating the resistances $R_1$ to $R_3$, respectively, are identified in advance, based on the data sets acquired when the vehicle travels on the dry road surface, in the same manner as for the coefficient $C_0$. In this manner, once the resistances $R_1$ to $R_3$ during the time of the vehicle traveling are calculated, it becomes possible to calculate the grade resistance $R_4$ based on these resistances $R_1$ to $R_3$ and the driving force F. The coefficients $C_1$ to $C_3$, which are identified correspondingly to the resistances $R_1$ to $R_3$, and the grade resistance $R_4$ according to the present embodiment will now be described.

Air Resistance

The air resistance $R_1$ is a resistance proportional to the square of the vehicle speed $V^2$, and the air resistance coefficient $C_1$ is a coefficient for calculating the air resistance $R_1$ based on the data of the vehicle speed V. Assuming a relationship $F=C_1V^2+c$ (c is a constant) between the driving force F and the square of the vehicle speed $V^2$, the air resistance coefficient $C_1$ can be identified by performing a regression analysis on a large number of data sets of the driving force F and the vehicle speed V at the time of the vehicle traveling on the dry road surface. The method of the regression analysis is not limited to a particular method, but may be a least squares method or a sequential least squares method, for example.

Acceleration Resistance

The acceleration resistance $R_2$ is a resistance proportional to the longitudinal acceleration α, and the acceleration resistance coefficient $C_2$ is a coefficient for calculating the acceleration resistance $R_2$ based on the data of the longitudinal acceleration α. Assuming a relationship $F_1=C_2\alpha+C_3$ between the driving force $F_1$, obtained by subtracting the air resistance $R_1$ from the driving force F, and the longitudinal acceleration α, the acceleration resistance coefficient $C_2$ can be identified by performing a regression analysis on a large number of data sets of the driving force $F_1$ and the longitudinal acceleration α at the time of the vehicle traveling on a dry road surface. The method of the regression analysis is not limited to a particular method, but may be a least squares method or a sequential least squares method, for example.

Rolling Resistance

The rolling resistance $R_3$ is a resistance proportional to the mass M. The rolling resistance $R_3$ at the time of the vehicle traveling on a dry road surface with no grade is represented by a coefficient $C_3$ in the above $F_1=C_2\alpha+C_3$, and corresponds to the intercept R of the straight line L1 in FIG. 3. In other words, the coefficient $C_3$ itself can be considered as the rolling resistance $R_3$.

Grade Resistance

The grade resistance $R_4$ is a resistance the vehicle 1 receives, depending on the gradient of the road surface on which the vehicle 1 is traveling. Due to the grade resistance $R_4$, the intercept R of the straight line L1 in FIG. 3 becomes large on an uphill, and the intercept R becomes small on a downhill. The grade resistance $R_4$ can be a driving force $F_3$ obtained by further subtracting the acceleration resistance $R_2$ and the rolling resistance $R_3$ from the driving force $F_1$, under the condition that the road surface on which the vehicle 1 currently travels is a dry road surface. When an acceleration sensor capable of detecting the longitudinal acceleration $\alpha$ of the vehicle 1 is used in acquiring the longitudinal acceleration $\alpha$, it is possible not to take the effect of the grade resistance $R_4$ into consideration. In other cases, for example, when the longitudinal acceleration $\alpha$ is acquired by time-differentiating the vehicle speed V, and when time-series position information of the vehicle 1 is acquired from a satellite positioning system such as a GPS and the longitudinal acceleration $\alpha$ is calculated based on the position information, it is preferable to consider the effect of the grade resistance $R_4$. Information on the longitudinal acceleration $\alpha$ acquired by these methods is also an example of "acceleration data indicating the longitudinal acceleration" according to the present invention.

The coefficients $C_1$ to $C_3$ described above are preferably identified based on the data set of the vehicle speed V, the driving force F, and the longitudinal acceleration $\alpha$ acquired when it is determined that the vehicle 1 is traveling on a dry road surface, after the vehicle 1 has started driving and before the estimation process, to be described later, is executed, and are stored in the estimation apparatus 2. It is possible to determine whether the vehicle 1 is traveling on a dry road surface, for example, by plotting points of a data set of a large number of longitudinal accelerations $\alpha$ and driving forces F acquired while the vehicle 1 is traveling onto the $\alpha$-F plane, and determining whether the plotted points converge substantially to a specific area. In other words, when the plot points substantially converge to a specific area, it is determined that the vehicle is traveling on a dry road surface, and when the plotted points deviate frequently from the specific area, it is determined that the vehicle is not traveling on the dry road surface. Note that, as to of the coefficient $C_0$ and the coefficient $C_1$, once their values are identified on the vehicle 1, respectively, it is possible to keep using the same values, but as to the value of the coefficient $C_0$, it is also possible to update the value via network communication, for example, every time when the tire $T_{FL}$, $T_{FR}$, $T_{RL}$, or $T_{RR}$ is replaced, based on the type of the tire $T_{FL}$, $T_{FR}$, $T_{RL}$, or $T_{RR}$. The coefficients $C_2$ and $C_3$ are preferably identified every time it is highly likely that an occupant or a load of the vehicle 1 has changed, for example, when the vehicle 1 stops for a certain length of time or longer, and then starts traveling.

3. Process of Estimating Thickness of Water Film

Figure 5:
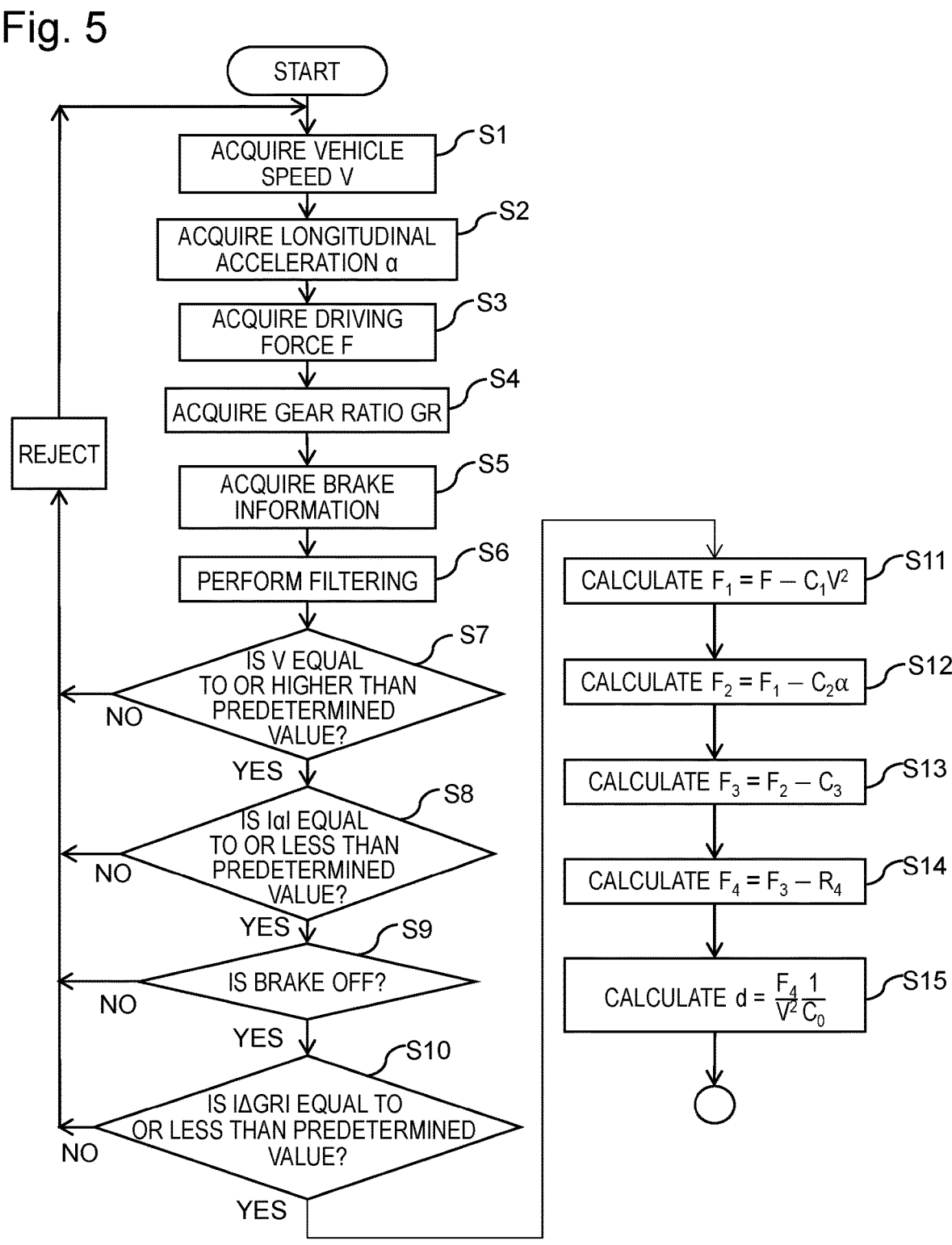
FIG. 5 is a flowchart showing the sequence of an estimation process according to the embodiment.

FIG. 5 is a flowchart showing the sequence of operation performed by the estimation apparatus 2. The process of estimating a thickness of a water film, performed by the estimation apparatus 2 will now be described with reference to FIG. 5. This estimation process may be repeated while the power of the electric system of the vehicle 1 is on.

In step S1 the data acquisition unit 21 acquires the vehicle speed V of the vehicle 1. The data acquisition unit 21 acquires output signals (wheel speed data) from the wheel speed sensors 6 in a predetermined sampling period, converts the output signals into wheel speeds V1 to V4 of the tires $T_{FL}$, $T_{FR}$, $T_{RL}$, and $T_{RR}$, respectively, and calculates the vehicle speed V based on the wheel speeds V1 to V4. A method of calculating the vehicle speed V based on the wheel speeds V1 to V4 is not limited to a particular method, but in the present embodiment, the radius r of the tires $T_{FL}$, $T_{FR}$, $T_{RL}$, and $T_{RR}$ multiplied with an average of the wheel speeds V3 and V4 of the respective tires $T_{RL}$ and $T_{RR}$, which are driven wheel tires, and the resultant value is established as the vehicle speed V. It is assumed herein that the radius r is stored in the estimation apparatus 2 in advance.

In step S2, the data acquisition unit 21 acquires the longitudinal acceleration a of the vehicle 1. The data acquisition unit 21 receives an output signal from the acceleration sensor 7 in a predetermined sampling period, and converts the signal into the longitudinal acceleration $\alpha$ of the vehicle 1.

In step S3, the data acquisition unit 21 acquires the driving force F of the vehicle 1. The data acquisition unit 21 receives an output signal from the torque sensor 4 in a predetermined sampling period, and converts the output signal into the wheel torque WT per driving wheel. The data acquisition unit 21 calculates the driving force F of the vehicle 1 from the converted wheel torque WT. The driving force F can be calculated, for example, by dividing the wheel torque WT by the radius r of the tires, and adding the results for all the driving wheels.

In step S4, the data acquisition unit 21 acquires a gear ratio GR. The gear ratio GR can be calculated, for example, by dividing the rotation speed of the engine by the rotation speed of the tire. The rotation speed of the tire may be, without limitation, an average of the wheel speeds V3 and V4 of the tires $T_{RL}$ and $T_{RR}$, which are driven wheel tires. The data acquisition unit 21 according to the present embodiment acquires the rotation speed of the engine by acquiring an output signal from an engine control mechanism, and calculates the gear ratio GR based on the acquired engine rotation speed and the output signals corresponding to the wheel speeds V3 and V4 from the wheel speed sensors 6. The gear ratio GR is used in a data determination, which will be described later.

In step S5, the data acquisition unit 21 acquires brake information. The brake information is information indicating whether the brake pad is being operated (that is, whether the brake is ON) or not (that is, whether the brake is OFF). The data acquisition unit 21 acquire brake information indicating ON/OFF of the brake by acquiring a signal indicating the pressure on the brake pad output from a brake control mechanism, for example. The brake information is used in the data determination, which will be described later, in the same manner as the gear ratio GR.

The order in which steps S1 to S5 are performed is not limited to the order described above, and may be changed as appropriate. The data sampling period for the vehicle speed V, the longitudinal acceleration $\alpha$, the driving force F, the gear ratio GR, and the brake information are not limited to a particular period, but may be 40 ms, as an example.

In steps S1 to S5, the pieces of data corresponding to the vehicle speed V, the longitudinal acceleration $\alpha$, the driving force F, the gear ratio GR, and the brake information that are acquired at the same time or substantially the same time are handled as a data set belonging to the same time point, and are sequentially stored in the RAM 14 or the storage device 15. The processes in steps S1 to S5 are repeated until the number of such data sets acquired and accumulated in the RAM 14 or the storage device 15 reaches a predetermined number or more. In other words, by repeating the processes in steps S1 to S5, a plurality of time-series data sets are accumulated in the RAM 14 or the storage device 15.

In step S6, the data determination unit 22 performs filtering for removing measurement errors in the vehicle speed V, the longitudinal acceleration α, and the driving force F having been acquired up to this point. The filtering method is not limited to any particular method, but may be smoothing, in which a moving average is calculated over a predetermined number of pieces of data, for example, performed for each of a plurality of pieces of time-series data of the vehicle speed V, the longitudinal acceleration α, and the driving force F acquired in steps S1 to S3, respectively. Preferably, filtering is also applied to the wheel speeds V1 to V4, for step S15, which will be described later.

In the following steps S7 to S10, the data determination unit 22 performs a data set determination. A data set determination is a process of determining whether the data set accumulated so far is suitable for estimating the thickness d of the water film after step S11. When it is determined in any of steps S7 to S10 that the data set is not suitable (NO), the entire accumulated data set is deleted from the RAM 14 or the storage device 15, and is not used in estimation of the thickness d (that is, the data set is rejected). The process of steps S1 to S5 are then started again. In each of steps S7 to S10, when it is determined that the data set is suitable (YES), the following step is executed. The order at which steps S7 to S10 are performed is not limited to the order described below, and may be changed as appropriate.

In step S7, the data determination unit 22 determines whether the vehicle speed V is equal to or higher than a predetermined value (YES) or not (NO). The predetermined value is a threshold of the vehicle speed V determined through experiments or simulations in advance. If the vehicle speed V is equal to or higher than the predetermined value, the data determination unit 22 determines that the accumulated data set is suitable for the estimation of the thickness d of the water film, and executes the next step S8. By contrast, if the vehicle speed V is lower than the predetermined value, the data determination unit 22 determines that the accumulated data set is not suitable for the estimation of the thickness d of the water film, and rejects the accumulated data set. This is to suppress variation in the thickness d of the water film calculated in the subsequent steps. The reason why the variation in the thickness d can be suppressed by this process in step S7 will be described later. Note that the data determination unit 22 may also determine whether the vehicle speed V exceeds a predetermined value (YES) or not (NO), and execute step S8 if the vehicle speed V exceeds the predetermined value (YES), and reject the accumulated data set if the vehicle speed V is equal to or lower than the predetermined value (NO).

In step S8, the data determination unit 22 determines whether the absolute value of the longitudinal acceleration α is equal to or less than a predetermined value (YES) or not (NO). The predetermined value is a threshold of an absolute value of the longitudinal acceleration a determined through experiments or simulations in advance. If the absolute value of the longitudinal acceleration a is equal to or less than a predetermined value, the data determination unit 22 determines that the accumulated data set is suitable for the estimation of the thickness d of the water film, and executes the next step S9. By contrast, if the absolute value of the longitudinal acceleration a exceeds the predetermined value, the data determination unit 22 determines that the accumulated data set is not suitable for the estimation of the thickness d of the water film, and rejects the accumulated data set. According to the study of the inventors of the present invention, when the data set is selected based on the absolute value of the longitudinal acceleration α, the estimation accuracy of the thickness d of the water film is improved. Note that the data determination unit 22 may also determine whether the absolute value of the longitudinal acceleration α is less than a predetermined value (YES) or not (NO), execute step S9 if the absolute value of the longitudinal acceleration α is less than the predetermined value (YES), and reject the accumulated data set if the absolute value of the longitudinal acceleration α is equal to or greater than the predetermined value (NO).

In step S9, the data determination unit 22 determines whether the accumulated data set is a data set during the time in which the brake operation is not being performed (YES) or not (NO). If it is determined that the accumulated data set is a data set during the time in which the brake operation is being not performed, the data determination unit 22 executes the next step S10. By contrast, if it is determined that the accumulated data set is a data set acquired during the brake operation, the data determination unit 22 rejects the accumulated data set. This is because, in the data set acquired during the brake operation, the driving force F is higher than the actual force, with respect to the longitudinal acceleration α, and has an undesirable effect on the estimation of the thickness d of the water film.

In step S10, the data determination unit 22 determines whether the absolute value of the amount of change ΔGR in the gear ratio GR over a predetermined time is equal to or less than a predetermined value (YES) or not (NO). The predetermined value is a threshold of the absolute value of ΔGR determined through experiments or simulations in advance. If the absolute value of ΔGR is equal to or less than the predetermined value, the data determination unit 22 determines that the accumulated data set is suitable for the estimation of the thickness d of the water film, and executes the next step S11. By contrast, if the absolute value of ΔGR exceeds the predetermined value, the data determination unit 22 determines that the accumulated data set is not suitable for the estimation of the thickness d of the water film, and rejects the accumulated data set. This is because the driving force F in the data set acquired while the change in the gear ratio GR is at some level or greater tends to be acquired as a value higher than the actual force, with respect to the longitudinal acceleration α, and has an undesirable effect on the estimation of the thickness d of the water film. Note that the data determination unit 22 may also determine whether the absolute value of the amount of change ΔGR is less than a predetermined value (YES) or not (NO), execute step S11 if the absolute value of the change amount ΔGR is less than the predetermined value (YES), and reject the accumulated data set if the absolute value of the change amount ΔGR is equal to or greater than the predetermined value (NO).

In step S11, the estimation unit 23 calculates a driving force $F_1$ with the effect of the air resistance $R_1$ removed, from the driving force F and the vehicle speed V resultant of the filtering in step S6. The driving force $F_1$ may be calculated according to the following equation, using the air resistance coefficient $C_1$.

$$F_1 = F - C_1 V^2$$

In step S12, the estimation unit 23 calculates the driving force $F_2$ with the effect of the acceleration resistance $R_2$ removed, from the driving force $F_1$ calculated in step S11 and the longitudinal acceleration a resultant of the filtering in step S6. The driving force $F_2$ may be calculated according to the following equation, using the acceleration resistance coefficient $C_2$.

$$F_2 = F_1 - C_2\alpha$$

In step S13, the estimation unit 23 calculates the driving force $F_3$, with the effect of the rolling resistance $R_3$ removed, from the driving force $F_2$ calculated in step S12. The driving force $F_3$ may be calculated according to the following equation, using the coefficient $C_3$.

$$F_3 = F_2 - C_3$$

In step S14, the estimation unit 23 calculates the driving force $F_4$, with the effect of the grade resistance $R_4$ removed, from the driving force $F_3$ calculated in step S13. As described above, the grade resistance $R_4$ is a value calculated under an assumption that the traveling condition remains the same, and the road surface is a dry surface. The driving force $F_4$ can be calculated according to the following equation. In the present embodiment, step S14 is omitted.

$$F_4 = F_3 - R_4$$

By removing the effects of the resistances $R_1$ to $R_4$ from the driving force F, remaining is the fluid resistance $R_{water}$. In other words, the driving force $F_4$ calculated in step S14 (in the present embodiment, the driving force $F_3$ calculated in step S13) is equivalent to the fluid resistance $R_{water}$. In step S15, the estimation unit 23 estimates the thickness d of the water film based on the driving force $F_3$ or the driving force $F_4$, the coefficient $C_0$, and the vehicle speed V. The estimated thickness d can be calculated according to the following equation. In the equation, $F_4/V^2$ corresponds to the gradient C of the regression line $V^2$–$R_{water}$.

$$d = \frac{F_4}{V^2}\frac{1}{C_0} \qquad \text{[Equation 1]}$$

Assuming that the driving force $F_4$ includes variation not caused by the vehicle speed V, it can be seen that, based on the above equation, the thickness d of the water film is affected more by the variation in the driving force $F_4$ when the vehicle speed V is lower. In other words, it is more likely for the thickness d of the water film to vary when the thickness d is estimated using the data set acquired while the vehicle speed V is low, and to result in a lower accuracy in the estimation of the thickness d. By contrast, by estimating the thickness d of the water film using the data set acquired while the vehicle speed V is somewhat high, the effect of the variation in the driving force $F_4$ can be reduced. This is the reason why the variation in the estimated thickness d is suppressed by executing step S7 described above.

Through steps S1 to S15 described above, the thickness d of the water film on the road surface on which the vehicle 1 travels is estimated. In a configuration in which the vehicle 1 is connected to a satellite positioning system, this information may be associated with position information of the position where the thickness d of the water film is estimated. The estimation apparatus 2 may then transmit the thickness d of the water film associated with the position information to the server device 100 over the network. The server device 100 may be implemented as a general-purpose computer that includes a CPU, a ROM, a RAM, a communication module, and a nonvolatile rewritable storage device, for example. The server device 100 receives the thicknesses d of the water films at various positions from the plurality of estimation apparatuses 2, and collects the thicknesses d, to acquire water film information across a wider area. For example, the server device 100 may be configured to create a map indicating the thickness d of the water film based on the information received from the plurality of estimation apparatuses 2 within a predetermined time period, and provide the map to various computers connected over the network.

However, only with the information of the thickness d of the water film, it is difficult to determine whether the road surface on which the vehicle 1 is travelling is in the condition in which hydroplaning is likely to occur. Therefore, in the present embodiment, after step S15, a process of determining a hydroplaning risk, indicating the likeliness of hydroplaning to occur, in addition to the estimated thickness d of the water film, is further executed.

4. Hydroplaning Risk Determination Process

Figure 6:
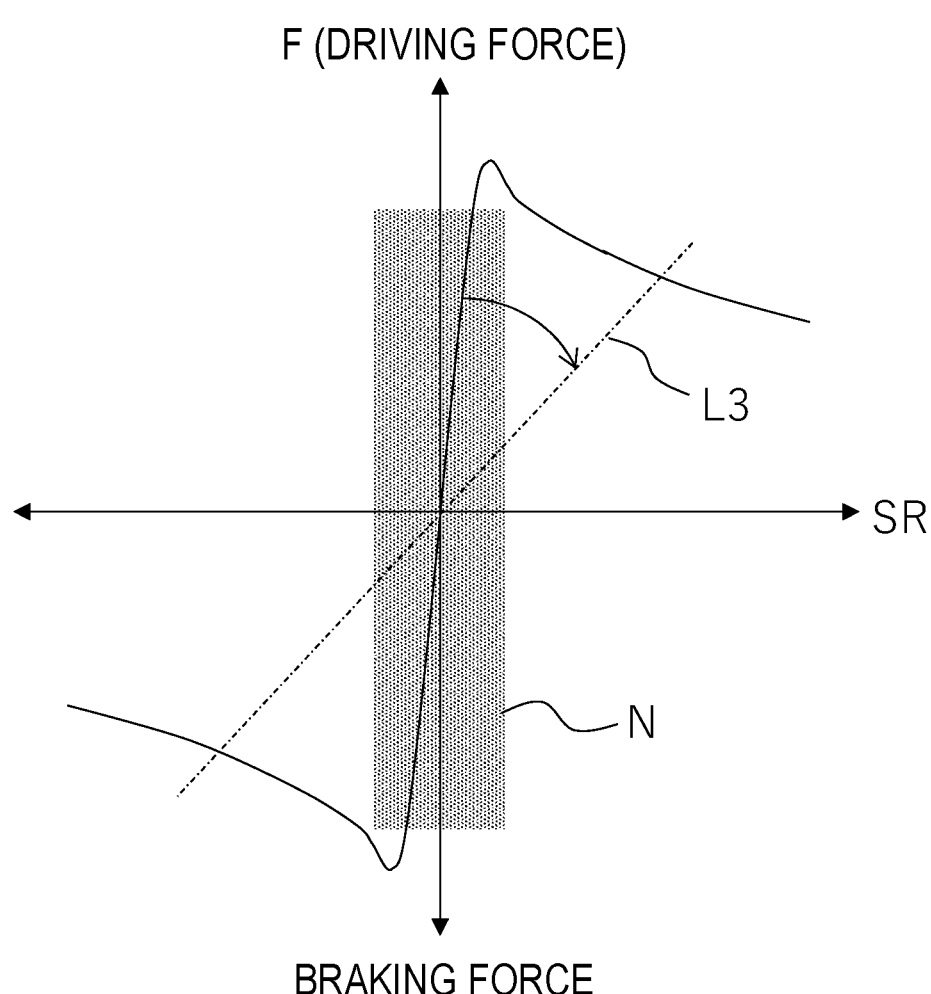
FIG. 6 is a chart of a slip ratio and a driving force.

FIG. 6 is an SR-F chart showing a relationship between a slip ratio SR and a driving force (braking force) F. A shaded region N illustrated in FIG. 6 is a region where plot points of a slip ratio SR and the driving force F substantially converge, under normal traveling of the vehicle 1 on a dry road surface. It can be considered that, in the region N, the slip ratio SR and the driving force F exhibits an approximate linear relationship represented by $F=b_1\times SR$. However, as the grip force of the tires on the road surface decreases due to causes such as flooding of the road surface, the approximate linear relationship between the slip ratio SR and the driving force F shifts toward the straight line L3. In other words, the relationship between the slip ratio SR and the driving force F shifts in a direction in which the gradient $b_1$ becomes smaller than that at the time of traveling on the dry road surface. This change suggests that the vehicle is highly likely to slip on the road surface. In other words, the gradient $b_1$ functions as an index representing the grip force of the tires with respect to the road surface.

Figure 7:
FIG. 7 is a graph plotting a square of a vehicle speed and a conventional tire grip force index.
Figure 7:
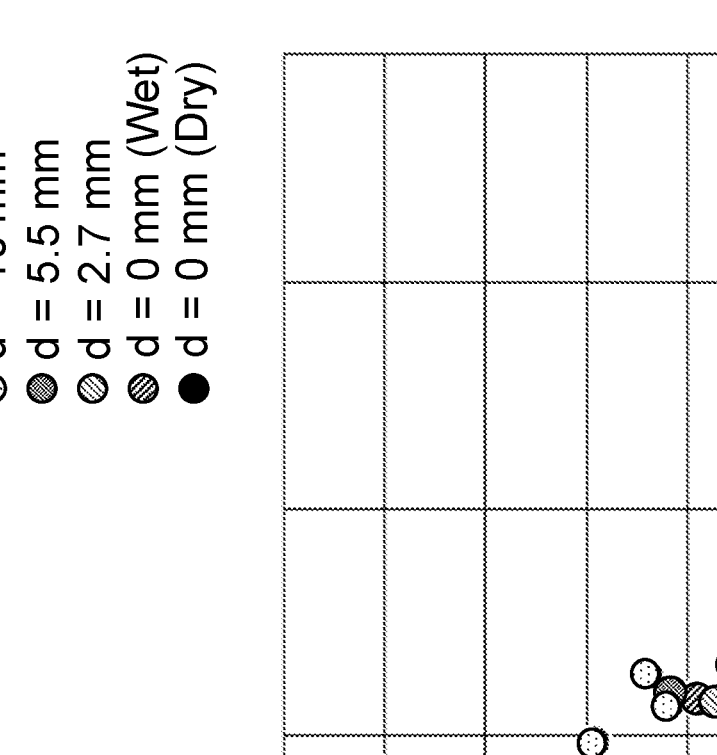
Figure 7:
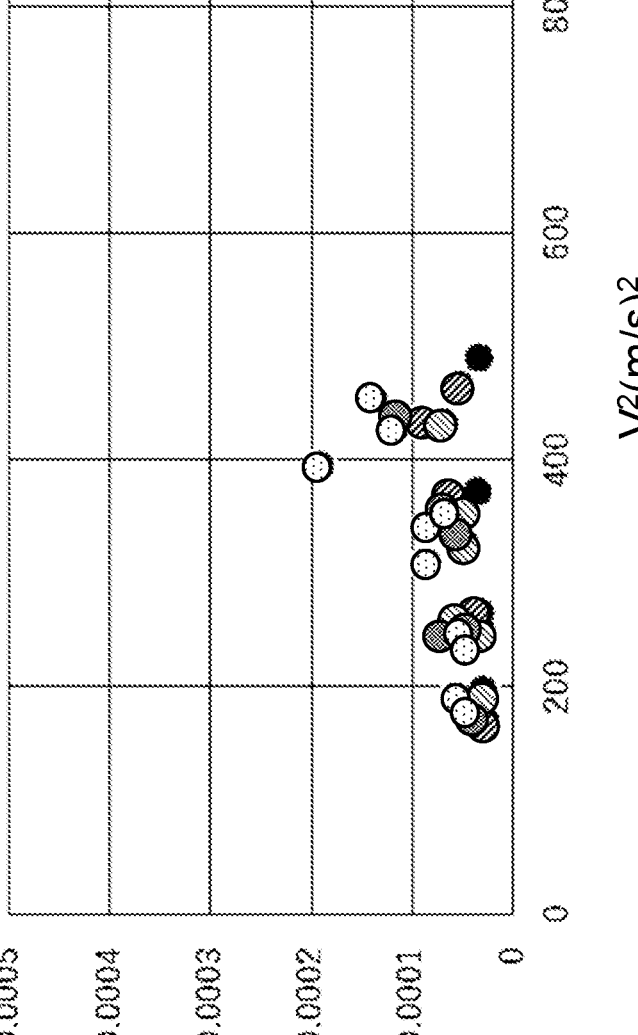

In the prior art documents (e.g., 2001-253334A, JP 2002-362345A), the applicant of the present application has disclosed techniques for determining the risk of slipping on a road surface based on a change in the gradient bi of the regression line between the slip ratio SR and the driving force F using the relationship described above. However, according to the study of the inventors of the present invention, it has not been possible to estimate the thickness d of the water film directly using the square $V^2$ of the vehicle speed and the gradient $b_1$, as shown in FIG. 7. By creating the SR-F chart that is based on the thickness d of the water film, by contrast, it becomes possible to determine the risk of hydroplaning based on the thickness d of the water film estimated using the method described above, and to improve the reliability at which a warning for hydroplaning is generated. The SR-F chart that is based on the thickness d of the water film can be created, for example, by causing the vehicle 1 to travel at various vehicle speeds V on road surfaces having water films of various thicknesses, and by acquiring a large number of data sets of the wheel speeds V1 to V4 and the driving force F. Based on a plurality of SR-F charts thus created, a threshold of the gradient $b_1$ is established, as appropriate, for each of the thicknesses d of the water film, the threshold being a threshold for determining that the risk of hydroplaning is high. The established threshold is stored in the estimation apparatus 2, in the manner associated with the thickness d of the water film.

Figure 8:
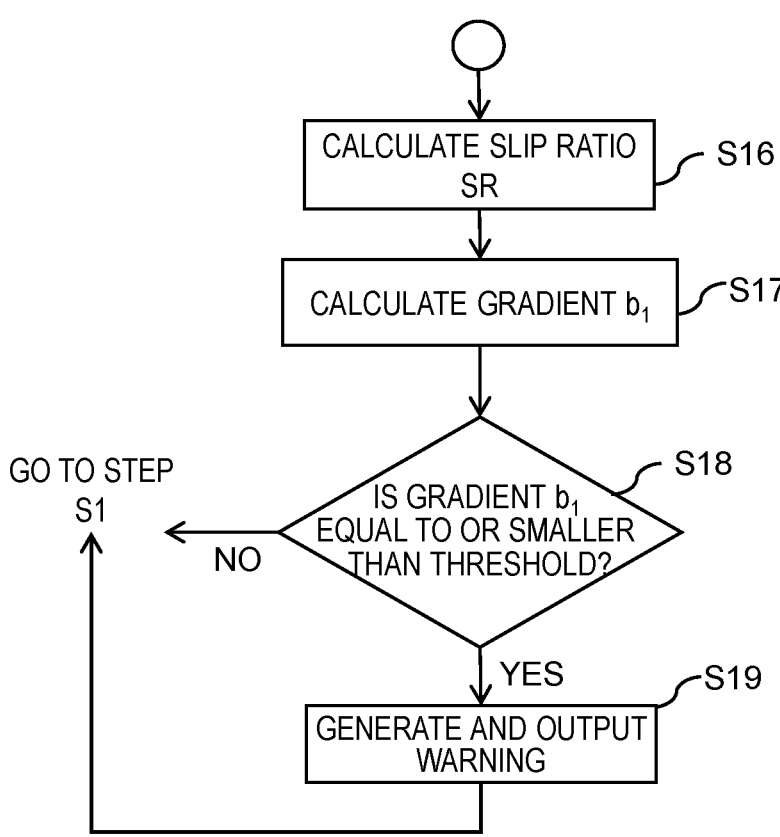
FIG. 8 is a flowchart showing the sequence of a hydroplaning risk determination process.

FIG. 8 is a flowchart showing the sequence of the operation of the estimation apparatus 2, performed subsequently to step S15 in FIG. 5. In step S16, the determination unit 24 calculates the slip ratio SR based on the data of the wheel speeds V1 to V4 and the vehicle speed V resultant of filtering in step S6. The slip ratio is generally defined as (tire rotation speed–vehicle speed)/vehicle speed. For example, in the present embodiment, the slip ratio can be calculated according to the following equation, using an average $V_d$ of the wheel speeds V1 and V2 of the tires $T_{FL}$ and $T_{FR}$, respectively, which are driving wheel tires.

$$SR = \{(rV_d - V)\}/V$$

In step S17, the determination unit 24 calculates the gradient bi of the straight line SR-F, based on a plurality of data sets of the slip ratio SR and the driving force F resultant of filtering. A method of calculating the gradient bi is not limited to a particular method, but a least squares method or a sequential least squares method may be used, for example.

In step S18, the determination unit 24 determines whether the risk of hydroplaning is high (YES) or low (NO), based on the gradient bi calculated in step 17. The determination unit 24 reads a threshold of the gradient $b_1$ corresponding to the thickness d of the water film closest to the thickness d of the water film calculated in step S15, from the ROM 13 or the storage device 15, and compares the gradient bi calculated in step S17 with the threshold. As a result of the comparison, if the gradient $b_1$ is equal to or smaller than the threshold, it is determined that the risk of hydroplaning is high (YES). If the gradient $b_1$ is greater than the threshold, it can be determined that the risk of hydroplaning is low (NO). Alternatively, the determination unit 24 may also determine that the risk of hydroplaning is high if the gradient bi is less than the threshold, and determine that the risk of hydroplaning is low if the gradient $b_1$ is equal to or greater than the threshold.

If it is determined that the risk of hydroplaning is low (NO) in step S18, steps S1 to S18 described above are repeated again. By contrast, if it is determined that the risk of hydroplaning is high (YES) in step S18, step S19 is executed.

In step S19, the warning output unit 25 generates a warning for notifying the driver of the vehicle 1 that the vehicle is highly likely to experience hydroplaning, and outputs the warning. A mode for outputting the warning is not limited to a particular mode. For example, the warning output unit 25 may cause the indicator 3 to display character information, an icon, or the like indicating that the vehicle is likely to experience hydroplaning, or may cause a speaker of the vehicle 1 to output a warning, as warning sound or voice, in addition to or instead of presenting the warning visually. Steps S1 to S18 described above are then repeated again. The warning may be output repeatedly until it is determined that the risk of hydroplaning is low in step S18.

5. Variations

Although one embodiment of the present invention has been described above, the present invention is not limited to the above embodiment, and various variations are still possible within the scope not deviating from the gist of the present invention. For example, following variations are possible. The gist of the following variations may be combined as appropriate.

(1) Driving force data representing the output driving force of the driving source of the vehicle 1 is not limited to the output signal of the torque sensor 4. Examples of such driving force data include sensing data that can be converted into the driving force F in the embodiment described above. Examples thereof include an engine torque signal representing an engine torque, or a motor torque signal representing a torque of a motor that is a driving source. In such a case, it is possible to omit the torque sensor 4 in the vehicle 1. In addition, the output from the torque sensor 4 may be handled as a wheel torque per driving wheel as it is, without converting the torque into a driving force. In such a case, however, it becomes necessary to convert the resistances $R_1$ to $R_4$ into a torque of each of the tires.

(2) The processes in steps S4 to S10 and steps S15 to S19 may be omitted. Furthermore, the timing at which the slip ratio SR is calculated is not limited a particular timing, as long as the timing is after the wheel speeds V1 to V4 and the vehicle speed V are acquired.

(3) As described above, the longitudinal acceleration a may also be calculated based on the vehicle speed V. In this case, the acceleration sensor 7 in the vehicle 1 may be omitted. When the longitudinal acceleration a is acquired based on the vehicle speed V, the timing thereof is not limited to a particular timing, as long as it is after the vehicle speed V is acquired. In addition, the communication interface 10 in the vehicle 1 may be omitted.

(4) At least a part of steps S1 to S19 may be performed, not by the estimation apparatus 2 itself, but by one or a plurality of computers outside the vehicle 1 capable of establishing data communication with the estimation apparatus 2. For example, the estimation apparatus 2 may transmit the data sets acquired by the data acquisition unit 21 sequentially to the server device 100, and the server device 100 or one or a plurality of computers connected thereto may be caused to perform at least a part of steps S1 to S18. Furthermore, at least some of the coefficients $C_0$ to $C_3$ may be identified not by the estimation apparatus 2 but by one or more computers outside the vehicle 1, or may be identified by the server device 100 while the vehicle 1 is traveling. The program 9 may be installed on one or more computers that are caused to perform the at least a part of steps S1 to S19.

(5) The thickness d of the water film may be estimated without using the equation that is based on the fluid resistance $R_{water}$ (the driving force $F_3$ or the driving force $F_4$), the coefficient $C_0$, and the vehicle speed V. For example, it is possible to create a map in which a $V^2$–$R_{water}$ plane such as that illustrated in FIG. 4 is divided into regions based on the thicknesses of the water film (each with a constant width), in advance, using a large number of data sets of the vehicle speed V, the fluid resistance $R_{water}$, and the thickness d of the water film acquired through experiments, and to predict a range of thicknesses of water film based on which region of the map the plot points of $V^2$ and the fluid resistance $R_{water}$, calculated while the vehicle 1 is traveling, are located.

(6) The risk of hydroplaning may be determined in three or more levels, without limitation to the mode of determining the risk in two levels of either "high" or "low".

REFERENCE SIGNS LIST

1 Vehicle
2 Control unit (estimation apparatus)
3 Indicator

4 Wheel torque sensor
6 Wheel speed sensor
9 Program
21 Data acquisition unit
22 Data determination unit
23 Estimation unit
24 Determination unit
25 Warning output unit
FL Front left wheel
FR Front right wheel
RL Rear left wheel
RR Rear right wheel

The invention claimed is:

1. An estimation apparatus for a water film thickness on a road surface, the apparatus comprising:
   a data acquisition unit that sequentially acquires a data set including driving force data representing a driving force output from a driving source of a vehicle and acceleration data representing a longitudinal acceleration of the vehicle, while the vehicle is traveling;
   an estimation unit that estimates a thickness of a water film on a road surface on which the vehicle travels, based on the data set,
   wherein the estimation unit estimates the thickness of the water film based on a relationship between a speed of the vehicle and a fluid resistance that the vehicle receives from the water film, the flow resistance being calculated based on the data set.

2. The estimation apparatus for a water film thickness on a road surface according to claim 1, wherein the estimation unit estimates the thickness of the water film based on a gradient of a regression line between a square of the speed of the vehicle and the fluid resistance.

3. The estimation apparatus for a water film thickness on a road surface according to claim 2, wherein the estimation unit estimates the thickness of the water film based on the data set during a time period in which the speed of the vehicle is equal to or higher than a predetermined speed or the speed of the vehicle is higher than a predetermined speed.

4. The estimation apparatus for a water film thickness on a road surface according to claim 2, wherein the data acquisition unit acquires wheel speed data representing a wheel speed of a wheel of the vehicle.

5. The estimation apparatus for a water film thickness on a road surface according to claim 1, wherein the estimation unit estimates the thickness of the water film based on the data set during a time period in which the speed of the vehicle is equal to or higher than a predetermined speed or the speed of the vehicle is higher than a predetermined speed.

6. The estimation apparatus for a water film thickness on a road surface according to claim 5, wherein the data acquisition unit acquires wheel speed data representing a wheel speed of a wheel of the vehicle.

7. The estimation apparatus for a water film thickness on a road surface according to claim 1, wherein the data acquisition unit acquires wheel speed data representing a wheel speed of a wheel of the vehicle.

8. A water film thickness estimation method executed by one or a plurality of computers, the method comprising:
   sequentially acquiring a data set including driving force data representing a driving force output from a driving source of a vehicle and acceleration data representing a longitudinal acceleration of the vehicle, while the vehicle is traveling; and
   estimating a thickness of a water film on a road surface on which the vehicle travels, based on the data set,
   wherein the estimating includes calculating a fluid resistance that the vehicle receives from the water film based on the data set, and estimating the thickness of the water film based on a relationship between the calculated fluid resistance and a speed of the vehicle.

9. The water film thickness estimation method according to claim 8, wherein the estimating includes estimating the thickness of the water film based on a gradient of a regression line between a square of the speed of the vehicle and the fluid resistance.

10. The water film thickness estimation method according to claim 9, wherein the estimating includes estimating the thickness of the water film based on the data set during a time period in which the speed of the vehicle is equal to or higher than a predetermined speed or the speed of the vehicle is higher than a predetermined speed.

11. The water film thickness estimation method according to claim 9, wherein the acquiring includes acquiring wheel speed data representing a wheel speed of a wheel of the vehicle.

12. The water film thickness estimation method according to claim 8, wherein the estimating includes estimating the thickness of the water film based on the data set during a time period in which the speed of the vehicle is equal to or higher than a predetermined speed or the speed of the vehicle is higher than a predetermined speed.

13. The water film thickness estimation method according to claim 12, wherein the acquiring includes acquiring wheel speed data representing a wheel speed of a wheel of the vehicle.

14. The water film thickness estimation method according to claim 8, wherein the acquiring includes acquiring wheel speed data representing a wheel speed of a wheel of the vehicle.

15. A non-transitory computer-readable medium storing a program for estimating a water film thickness, the program causing one or a plurality of computers to execute:
   sequentially acquiring a data set including driving force data representing a driving force output from a driving source of a vehicle and acceleration data representing a longitudinal acceleration of the vehicle, while the vehicle is traveling; and
   estimating a thickness of a water film on a road surface on which the vehicle travels, based on the data set,
   wherein the estimating includes calculating a fluid resistance that the vehicle receives from the water film based on the data set, and estimating the thickness of the water film based on a relationship between the calculated fluid resistance and a speed of the vehicle.

* * * * *